US00RE49871E

(19) United States
(12) Reissued Patent
Bird et al.

(10) Patent Number: US RE49,871 E
(45) Date of Reissued Patent: Mar. 12, 2024

(54) WIRED AND WIRELESS AUDIO OUTPUT DEVICE FOR IN-VEHICLE ENTERTAINMENT SYSTEM

(71) Applicant: Safran Passenger Innovations, LLC, Brea, CA (US)

(72) Inventors: Randall Bird, Brea, CA (US); Christopher Healy, Brea, CA (US); Matthew Gledich, Brea, CA (US); Romain Lecomte, Brea, CA (US); Brian Simone, Brea, CA (US); Matteo Berioli, Munich (DE); Eriza Fazli, Gilching (DE); Macià Mut Vidal, Illes Balears (ES)

(73) Assignee: Safran Passenger Innovations, LLC, Brea, CA (US)

(21) Appl. No.: 17/511,403

(22) Filed: Oct. 26, 2021

Related U.S. Patent Documents

Reissue of:
(64) Patent No.: 10,499,345
Issued: Dec. 3, 2019
Appl. No.: 16/051,342
Filed: Jul. 31, 2018

U.S. Applications:
(60) Provisional application No. 62/539,211, filed on Jul. 31, 2017.

(51) Int. Cl.
*H04R 5/04* (2006.01)
*H04L 29/06* (2006.01)
(Continued)

(52) U.S. Cl.
CPC ..... *H04R 5/04* (2013.01); *H04L 65/00* (2013.01); *H04L 65/612* (2022.05);
(Continued)

(58) Field of Classification Search
CPC .. H04R 5/04; H04R 2420/07; H04R 2499/13; H04L 65/00; H04L 65/612; H04L 67/12; H04W 52/245; H04W 4/48; H04W 4/80
See application file for complete search history.

(56) References Cited

U.S. PATENT DOCUMENTS 9,355,285 B1 * 5/2016 Wade ..... G06K 7/01
9,799,025 B2 * 10/2017 Skoog ..... G06Q 20/3272
(Continued)

FOREIGN PATENT DOCUMENTS

JP 2003047066 A 2/2003
JP 2006024629 A 1/2006
(Continued)

OTHER PUBLICATIONS

European Patent Office, Extended European Search Report, dated Aug. 4, 2021.
(Continued)

*Primary Examiner* — Matthew E Heneghan
(74) *Attorney, Agent, or Firm* — Ryan Dean; Umberg Zipser LLP

(57) ABSTRACT

Systems and methods are described for outputting audio information via both wired and wireless outputs from a in-flight or in-vehicle entertainment system. An audio output device can include a wireless transmitter and an audio output port. A transmission power of the wireless transmitter can be controlled via a processor based on a measured received signal strength indicator (RSSI) level of a connected slave device and a transmission power of the connected slave device.

12 Claims, 3 Drawing Sheets

(51) Int. Cl.

| | |
|---|---|
| ***H04L 65/00*** | (2022.01) |
| ***H04L 65/612*** | (2022.01) |
| ***H04W 4/80*** | (2018.01) |
| ***H04W 52/24*** | (2009.01) |
| *H04L 29/08* | (2006.01) |
| *H04L 67/12* | (2022.01) |
| *H04W 4/48* | (2018.01) |

(52) U.S. Cl.

CPC ..... *H04W 52/245* (2013.01); *H04L 67/12* (2013.01); *H04R 2420/07* (2013.01); *H04R 2499/13* (2013.01); *H04W 4/48* (2018.02); *H04W 4/80* (2018.02)

(56) References Cited

U.S. PATENT DOCUMENTS

2002/0168943 A1 11/2002 Callaway et al.
2005/0096080 A1 5/2005 Choi et al.
2007/0015485 A1* 1/2007 DeBiasio ..... H04B 1/082 455/345
2007/0135061 A1 6/2007 Buck et al.
2007/0287447 A1 12/2007 Cornell
2009/0007193 A1 1/2009 Correa et al.
2009/0075624 A1* 3/2009 Cox ..... H04B 1/082 455/345
2010/0020983 A1* 1/2010 Waites ..... H04R 5/04 381/79
2010/0054486 A1* 3/2010 Sollenberger ..... H03G 5/165 381/55
2010/0057472 A1* 3/2010 Zeng ..... H03G 17/0294 704/500
2011/0205162 A1 8/2011 Wäller et al.
2011/0299410 A1 12/2011 Diab et al.
2013/0089026 A1* 4/2013 Piper ..... H04W 4/00 370/328
2013/0102309 A1* 4/2013 Chande ..... H04W 52/244 455/435.1
2013/0262184 A1 10/2013 Jain et al.
2013/0301551 A1* 11/2013 Ghosh ..... H04W 72/042 370/329
2014/0187219 A1* 7/2014 Yang ..... H04W 4/046 455/418
2014/0194062 A1* 7/2014 Palin ..... H04W 24/00 455/41.2
2015/0098598 A1* 4/2015 Kulavik ..... H04S 1/005 381/309
2015/0181257 A1* 6/2015 Bai ..... H04N 21/4104 725/75
2015/0245078 A1 8/2015 Couleaud et al.
2015/0264656 A1* 9/2015 Carugati ..... H04B 7/0426 375/267
2015/0326258 A1* 11/2015 Song ..... H04B 17/318 455/127.2
2015/0347114 A1* 12/2015 Yoon ..... G06F 8/61 235/375
2016/0150352 A1* 5/2016 Saed ..... H04W 4/80 455/41.2
2016/0277044 A1* 9/2016 Song ..... H04B 1/04
2016/0350984 A1* 12/2016 Tieman ..... G07C 5/008
2017/0106834 A1* 4/2017 Williams ..... B60R 25/01
2017/0115952 A1* 4/2017 Gregory ..... B60R 16/037
2017/0195708 A1* 7/2017 Morales ..... H04M 1/72527
2017/0195772 A1* 7/2017 Han ..... H04R 1/1041
2017/0257750 A1* 9/2017 Gunasekara ..... H04W 4/90
2017/0264987 A1* 9/2017 Hong ..... H04R 1/1025
2018/0175478 A1* 6/2018 Morris ..... H04B 7/15
2018/0189020 A1* 7/2018 Oskarsson ..... G06F 3/165
2018/0189023 A1* 7/2018 Garmark ..... H04N 21/2343
2018/0189278 A1* 7/2018 Garmark ..... G06F 3/167
2018/0252796 A1* 9/2018 Qu ..... G01S 5/30
2018/0367883 A1* 12/2018 Minoo ..... H02J 7/0042
2019/0132107 A1* 5/2019 Ahn ..... H04L 5/0044

FOREIGN PATENT DOCUMENTS

JP 2017041755 A 2/2017
WO 2010005597 A2 1/2010
WO 2015184055 A1 12/2015

OTHER PUBLICATIONS

KIPO, Written Opinion of PCT Search Authority, dated Nov. 26, 2018.

* cited by examiner

WIRED AND WIRELESS AUDIO OUTPUT DEVICE FOR IN-VEHICLE ENTERTAINMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority to U.S. provisional application having Ser. No. 62/539,211 filed on Jul. 31, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is audio output interfaces, and, in particular, audio output interfaces for in-vehicle entertainment systems for passenger aircraft and other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Passengers are bringing more and more wireless headphones with them when on an aircraft or in other vehicles. To accommodate them, airlines would like to offer the possibility to connect headphones via Bluetooth™ or other wireless protocols in addition to the standard 3.5 mm stereo audio jack.

However, in a vehicle where every seat has a corresponding in-flight entertainment device, it is critical that the Bluetooth piconets must not interfere with each other during pairing and transmission of a plurality of Bluetooth devices.

Thus, there is still a need for systems and methods for providing both wired and wireless audio output for each device of an in-flight entertainment system.

SUMMARY OF THE INVENTION

The inventive subject matter provides apparatus, systems and methods in which an audio output device, preferably for a vehicle entertainment device, comprises parallel wireless and analog wired audio outputs, such that the same audio from the vehicle entertainment device or system can be outputted to a wired device and a wireless device synchronously.

Contemplated audio output devices comprise an audio output port for wired output of audio information, as well as a wireless transmitter. The audio output port may include one or more ports with exemplary ports including, but not limited to, a 3.5 mm stereo audio jack and a 2.5 mm ARINC C1 jack.

The wireless transmitter preferably is configured to communicatively coupled with wireless headphones or other devices for transmission of audio information to the wireless device. Although the below discussion focuses on the use of the Bluetooth protocol for wireless transmission of the audio information, any commercially suitable protocol could be used.

Because of the sheer number of wireless transmitters that may be in use within an aircraft or other vehicle, the inventive subject matter contemplates various systems and methods to reduce the risk of interference of the various transmitters from impacting passengers' quality of service of the vehicle entertainment system.

To reduce the risk of interference, it is contemplated that the audio output device can adjust a transmission power of the wireless transmitter of the audio output device as a function of a measured received signal strength indicator (RSSI) level of a connected slave device (e.g., wireless headphones) and a transmission power of the connected slave device.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
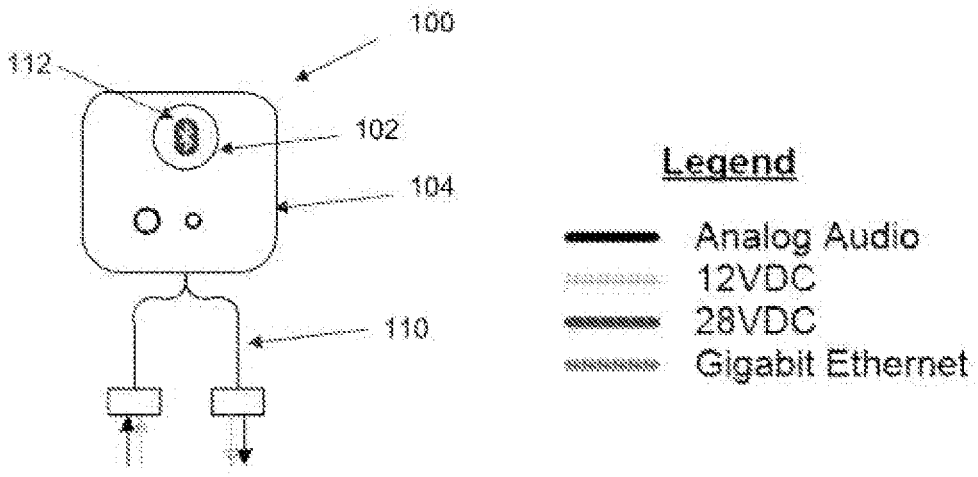
FIG. 1 illustrates an exemplary embodiment of an audio output device.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

The inventive subject matter describes systems and methods for providing both wired and wireless audio output for each device of an in-flight entertainment system. Thus, for example, it is contemplated that in some vehicles, each seat may have a device that displays video and outputs audio for a passenger. In many cases, the device may be mounted to the seat back of the immediate row in front of the seat. In such embodiment, each seat's device can have an audio output device for outputting audio via both wired and wireless connections. Although the below discussion focuses on an aircraft, it is contemplated that the systems and methods discussed herein could likewise be used on ships, trains, busses, and other vehicles.

Using the systems and methods contemplated herein, passengers in an aircraft or other vehicle are able to choose whether to connect headphones wirelessly, via Bluetooth or other commercially suitable protocol for example, and/or via a wired audio jack. Thus, both the wireless and wired audio outputs can function at the same time if desired because the system creates parallel wireless and analog wired audio outputs.

Contemplated audio output devices comprises a traditional 3.5 mm stereo audio jack for analog audio output and a 2.5 mm ARINC C1 jack for 12 VDC for Noise Cancelling Headphones, for example. Of course, it is contemplated that other wired outputs could be used as technology involves, without departing from the scope of the invention.

The audio output device preferably also includes a push button or other actuator, which could be digital, that permits pairing and unpairing of a wireless device such as wireless headphones for example. Importantly, pairing or unpairing of the wireless device does not affect (e.g., turn on or off) audio output via the wired audio output(s).

A light source, such as a light-emitting diode (LED), can be included to indicate the Bluetooth pairing state of the audio output device (e.g., Unpaired, Pairing, Paired, Faulty, etc.). In one contemplated embodiment, the LED can be installed to create a ring of light around the push button, for example, and through a Bluetooth logo, and could be done with different colors or by blinking.

An exemplary audio output device 100 is shown below in FIG. 1. The Bluetooth logo is disposed on the push button or other actuator 102 disposed on a surface of a housing 104.

Figure 3:
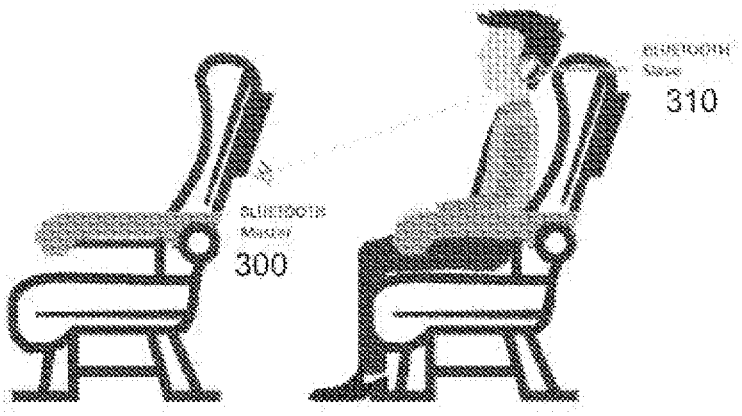
FIG. 3 illustrates exemplary positioning of Bluetooth master and slave devices within a vehicle.

It is further contemplated that the audio output device 100 can either be disposed at an individual seat within the vehicle (where analog audio and +12 VDC are received, for example) or be daisy chained (where analog audio and +12 VDC are passed-through to the next audio output device) depending on the vehicle's configuration. As an example shown in FIG. 3, the audio output device 300 may be disposed at a seat directly in front of where a passenger will be sitting, and where a wireless device 310 (Bluetooth slave) may be located). Thus, for example, in an aircraft with N rows, each having at least two seats, an audio output device could be disposed at each row, and even at each seat.

The device 100 can further include a wireless transmitter 112 as well as one or more wired audio outputs (jacks) 110. The audio output device can include a processor for managing the wireless transmitter, for example, or could utilize a processor of the associated entertainment system.

Figure 2:
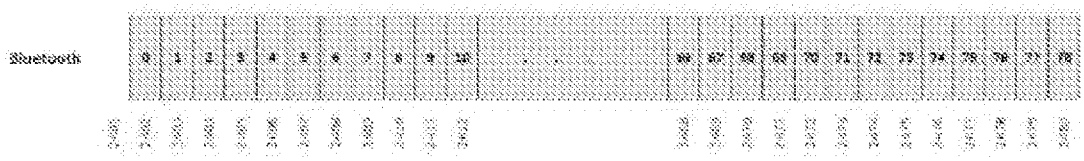
FIG. 2 illustrates a set of typical Bluetooth channels.

FIG. 2 illustrates a typical channel listing for the Bluetooth protocol having 79 channels in the 2.4 GHz ISM band.

Bluetooth devices can form a small network, called a Piconet, which can accommodate up to eight devices. In a Piconet, a Bluetooth device can either be a Master or a Slave device. Each Piconet uses the 79 channels in a frequency hopping manner, using the Frequency Hopped Spread Spectrum (FHSS) mechanism. The 79 channels are visited synchronously, following a pseudo-random hopping sequence, by the Master and all Slaves in the Piconet, with a dwell time of 625 microseconds in a channel (i.e. a hopping rate of 1,600 times per second).

The amount of interference observed by a Piconet is affected by the number of other Piconets in its proximity, since all of the Piconets are using the same set of 79 Bluetooth channels. If there is only a small number of co-located Piconets, the probability that some of them are hopping to the same channel at one particular time might be low. However, this collision probability increases as the number of co-located Piconets is increased.

Figure 4:
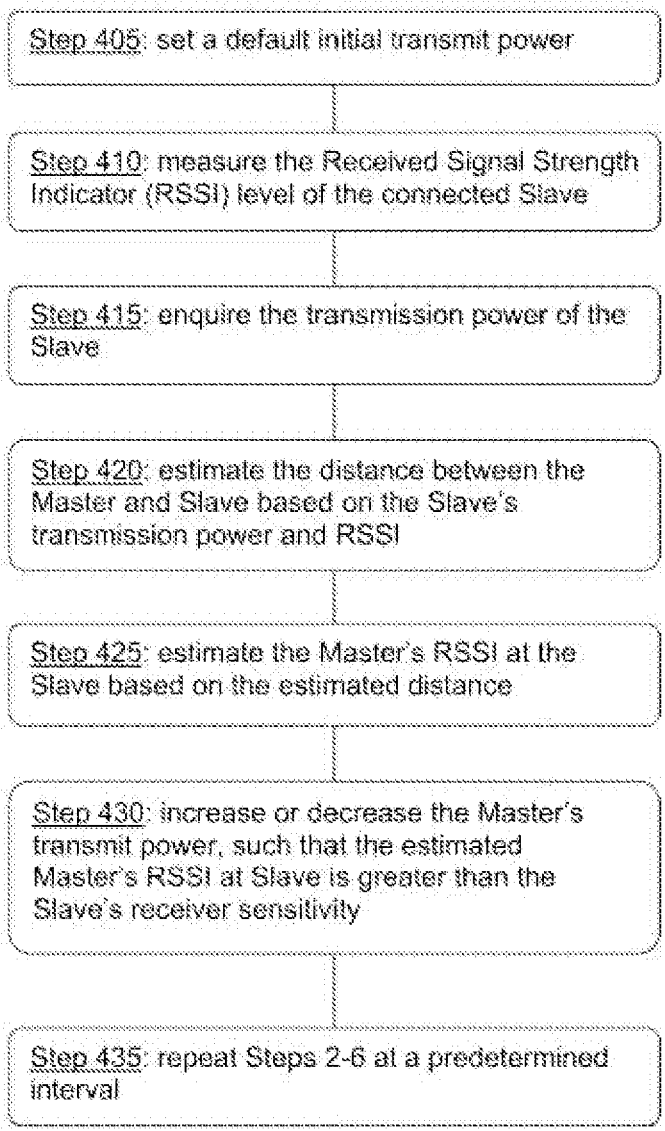
FIG. 4 illustrates one embodiment of a method of reducing a required transmission power for a wireless audio output.

In order to maintain some level of Quality of Service (QoS) in an environment where many Bluetooth Piconets are deployed in a close proximity, e.g. in an aircraft cabin or vehicle's interior, where a Piconet may correspond to the Bluetooth devices installed in a seat, a strategy of minimizing the transmit power of the Bluetooth Master should be employed. An exemplary method of minimizing transmission power is presented in FIG. 4. It is preferred that such methods ensure that a Piconet observes interference only from three seat rows: the one in front, its own row, and the one row at its rear.

To determine the required transmission power, the method requires the following steps that utilizes a dynamic algorithm and processor to adjust transmission power of a master device.

In step 405, a default initial transmit power for a wireless transmitter of a master device is set via a processor. To ensure that the transmission power is unlikely to interfere with wireless transmitters located more than a seat row in front of or behind where the master device is located, the processor can be configured to determine whether the transmission power should be increased or decreased.

On a periodic basis, the Received Signal Strength Indicator (RSSI) level of a wireless device (i.e., connected Slave to the master device) can be measured in step 410.

In step 415, a transmission power of the slave device can be requested by the processor of the master device.

In step 420, using the processor, a distance between the master device and the slave device can be estimated based on the transmission power of the slave device.

The RSSI of the master device at the slave device can be estimated in step 425 using the processor and based on the estimated distance between the master device and the slave device.

Based on estimated RSSI of the master device at the slave device, a transmission power of the master device can be increased or decreased, such that the estimated RSSI of the master device at the slave device is a set threshold above the slave device's receiver sensitivity.

Thus, by scaling down both transmission power of devices in Bluetooth Piconets, interferences are less likely, allowing more Bluetooth devices to work simultaneously in a dense environment such as an aircraft.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An audio output device having parallel wireless and analog wired audio outputs for outputting audio information from a vehicle entertainment system, comprising:

an audio output port configured to receive a physical connector for outputting audio over a wired connection;

a wireless transmitter configured to communicatively couple with a wireless device for transmission of audio information to the wireless device; and a processor configured to adjust a transmission power of the wireless transmitter as a function of a measured received signal strength indicator (RSSI) level of a connected slave device and a transmission power of the connected slave device;

wherein the device is configured to output audio signals to both the wired audio output port and the wireless transmitter simultaneously; and an actuator configured to cause the wireless transmitter to pair or unpair with the wireless device, and without interrupting an audio output via the audio output port.

2. The audio output device of claim 1, wherein the wireless transmitter comprises a Bluetooth transmitter.

3. The audio output device of claim 1, wherein the processor is further configured to estimate a distance between the wireless transmitter and the slave connected device and a RSSI level of the wireless transmitter at the slave connected device.

4. The audio output device of claim 3, wherein the processor is configured to adjust the transmission power of the wireless transmitter, such that the estimated RSSI level of the wireless transmitter at the slave connected device is a predefined threshold above a sensitivity of the slave connected device.

5. The audio output device of claim 1, wherein the wired audio output port comprises at least one of a 3.5 mm stereo audio jack and a 2.5 mm ARINC C1 jack.

6. A method of reducing a required transmission power for a wireless audio output, comprising:

selecting a master device having a wireless audio output;

measuring a RSSI level of a connected slave device using a processor of the master device;

the master requesting a transmission power of the connected slave device;

using the processor, estimating a distance between the wireless audio output of the master device and the connected slave device based on the transmission power and the RSSI level;

using the processor, estimating a second RSSI level of the wireless audio output of the master device at the connected slave device based on the estimated distance; and automatically adjust a transmission power of the wireless audio output of the master device using the processor, such that the transmission power is at a minimum threshold above a sensitivity of the connected slave device.

7. The method of claim 6, wherein the wireless audio output and connected slave device comprise Bluetooth transmitters.

8. The method of claim 6, further comprising the step of setting a default initial transmit power.

9. The method of claim 6, further comprising the master device performing the method of claim 8 at a predefined interval.

10. The method of claim 6, wherein the master device further comprises a wired audio output port, and wherein operation of the wireless audio output is independent of operation of the wired audio output.

11. The method of claim 10, wherein the master device is configured to output audio signals to both the wired audio output port and the wireless transmitter simultaneously.

12. The method of claim 11, wherein the wired audio output port comprises at least one of a 3.5 mm stereo audio jack and a 2.5 mm ARINC C1 jack.

* * * * *